United States Patent [19]

Nilsson et al.

[11] Patent Number: 4,746,282
[45] Date of Patent: May 24, 1988

[54] DOUGH ROUNDING MACHINE WITH ADJUSTABLE TROUGH

[75] Inventors: Leif Nilsson; Torsten Skoog, both of Glimakra, Sweden

[73] Assignee: Glimek AB, Glimakra, Sweden

[21] Appl. No.: 935,010

[22] Filed: Nov. 26, 1986

[30] Foreign Application Priority Data

Nov. 27, 1985 [SE] Sweden .............................. 85055945

[51] Int. Cl.⁴ .............................................. B29B 7/10
[52] U.S. Cl. .................................. 425/150; 249/162;
425/319; 425/332; 425/333
[58] Field of Search ............... 425/319, 332, 333, 142, 425/150; 249/162

[56] References Cited

U.S. PATENT DOCUMENTS

| | | | |
|---|---|---|---|
| 917,711 | 4/1909 | Callow | 425/333 |
| 933,658 | 9/1909 | Morie et al. | 249/162 |
| 2,828,526 | 4/1958 | Blasius et al. | 249/162 |
| 4,286,939 | 9/1981 | Benier | |

Primary Examiner—Jay H. Woo
Assistant Examiner—C. Scott Bushey
Attorney, Agent, or Firm—Merchant, Gould, Smith, Edell, Walter & Schmidt

[57] ABSTRACT

A dough rounding machine with a drum rotatable about a vertical axis, a frame disposed around the drum and a trough which is formed between the drum jacket and a number of trough elements mounted on the frame and extending helically adjacent the jacket. Each trough element has a rail fixedly mounted in the frame and abutting the drum, and a wall portion positioned on the rail and displaceable relative to the jacket. The dough rounding machine further comprises a control unit for adjusting the width of the trough, the unit comprising rotatable rods extending from the lower part to the upper part of the drum and substantially parallel to the drum jacket, and link means interconnecting the rods and the wall portions.

2 Claims, 7 Drawing Sheets

Fig. 4 ial chemical and biological properties. On rounding-up, gluten chains develop in the dough so that its surface layer becomes elastic, the gases formed during fermentation remaining within the dough piece and imparting to the bun the desired high shape. The width of the trough and the size of the dough piece must conform to each other since the dough piece will be pear-shaped after rounding-up if the trough is too narrow as compared with the dough piece, and it will not be sufficiently worked if the trough is too wide.

DOUGH ROUNDING MACHINE WITH ADJUSTABLE TROUGH

The present invention relates to a dough rounding machine with a conical drum which is rotatable about a vertical axis, a frame disposed around the drum and a trough which is formed between the jacket of the drum and a number of trough elements mounted on the frame and extending helically adjacent the jacket, each trough element comprising a rail fixedly mounted in the frame and abutting the drum, and a wall portion positioned on the rail and displaceable relative to the jacket.

Rounding-up is an important step in the baking process since this is where the dough is physically worked to obtain the required chemical and biological properties. On rounding-up, gluten chains develop in the dough so that its surface layer becomes elastic, the gases formed during fermentation remaining within the dough piece and imparting to the bun the desired high shape. The width of the trough and the size of the dough piece must conform to each other since the dough piece will be pear-shaped after rounding-up if the trough is too narrow as compared with the dough piece, and it will not be sufficiently worked if the trough is too wide.

The dough pieces produced by prior art dough rounding machines are of limited size, for example only 200 g–1200 g or 350 g–1600 g, depending on the width of the trough. The machines are not adjustable, for which reason bakers need a sizable machine equipment to be able to produce loaves and buns of various sizes. Very small buns must always be rounded-up by hand since the lower limit of all dough rounding machines available on the market is about 200 g.

U.S. Pat. No. 4,286,939 and its counterpart EP-B-0,023,737 disclose an adjustable dough rounding machine in which the trough is composed of flat bottom plates and a number of wall plates, each resting on the bottom plates. The wall plates are connected with a flexible shaft extending helically about the cylindrical drum, and are fixable at varying distance from the drum. This machine is unreliable and, because of the large number of wall plates, is unstable. The adjusting mechanism for the wall plates is very complicated, and therefore the machine is difficult to adjust.

The main object of the present invention is to provide a dough rounding machine which can be used for dough pieces of highly varying sizes.

A further object is to provide a dough rounding machine in which the width of the trough can be quickly and easily adjusted.

The dough rounding machine according to the present invention is characterised by a control unit for adjusting the width of the trough, said unit comprising rotatable rods extending from the lower part towards the upper part of the drum and substantially parallel to the drum jacket, and link means interconnecting said rods and said wall portions.

An important advantage of the present invention is that the width of the trough is adjustable within such wide limits that the machine can work dough pieces weighing from 18 to 1800 g. This means that even very small buns can be produced by means of the present invention, and therefore the baker is spared the very tiring rounding-up by hand which may cause joint injuries.

A further advantage is that the width of the trough can be quickly and readily adjusted in one motion also by an unskilled person.

One embodiment of the invention will be described in detail below, reference being had to the accompanying drawings in which.

Figure 1:
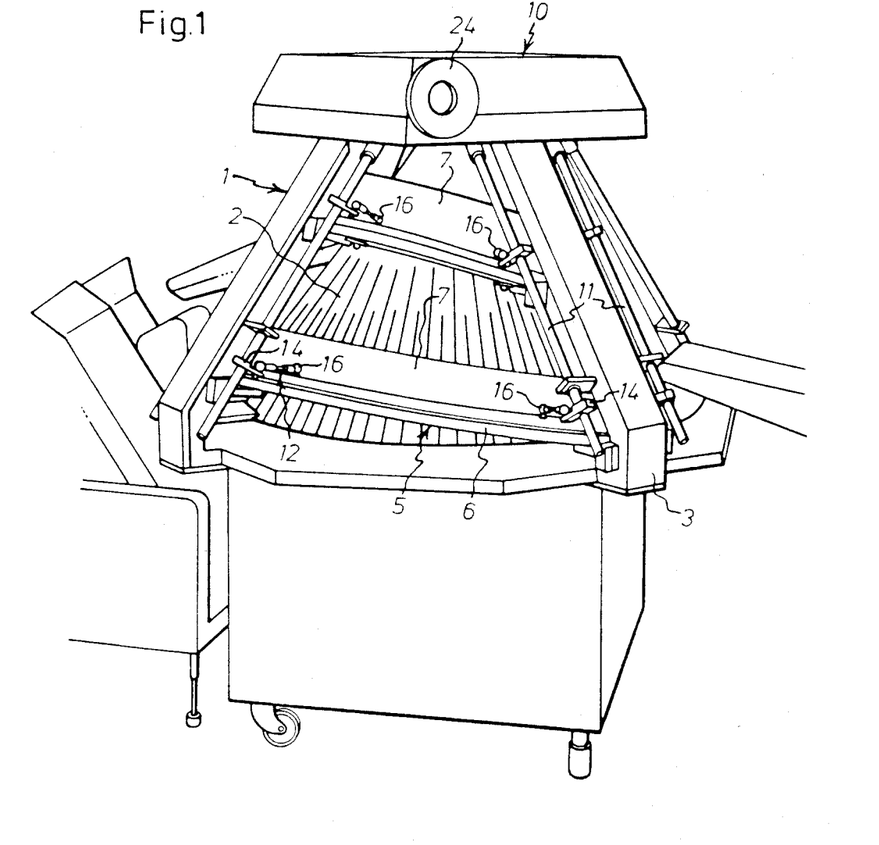
FIG. 1 is a perspective view of a dough rounding machine according to the invention.

FIG. 1 illustrates a dough rounding machine 1 having a conical drum 2 rotatable about a vertical axis, a frame 3 disposed around the drum, and a trough 4 formed between the drum jacket and a number of trough elements 5 mounted on the frame and extending helically adjacent the jacket. Each trough element comprises a rail 6 fixedly mounted in the frame and abutting the drum, and a wall portion 7 positioned on the rail and displaceable relative to the jacket. The dough rounding machine 1 further comprises a control unit 10 for adjusting the width of the trough 4, said unit comprising rotatable rods 11 extending from the lower part towards the upper part of the drum 2 and substantially parallel to the drum jacket, and link means 12 interconnecting said rods and said wall portions 7.

Figure 2:
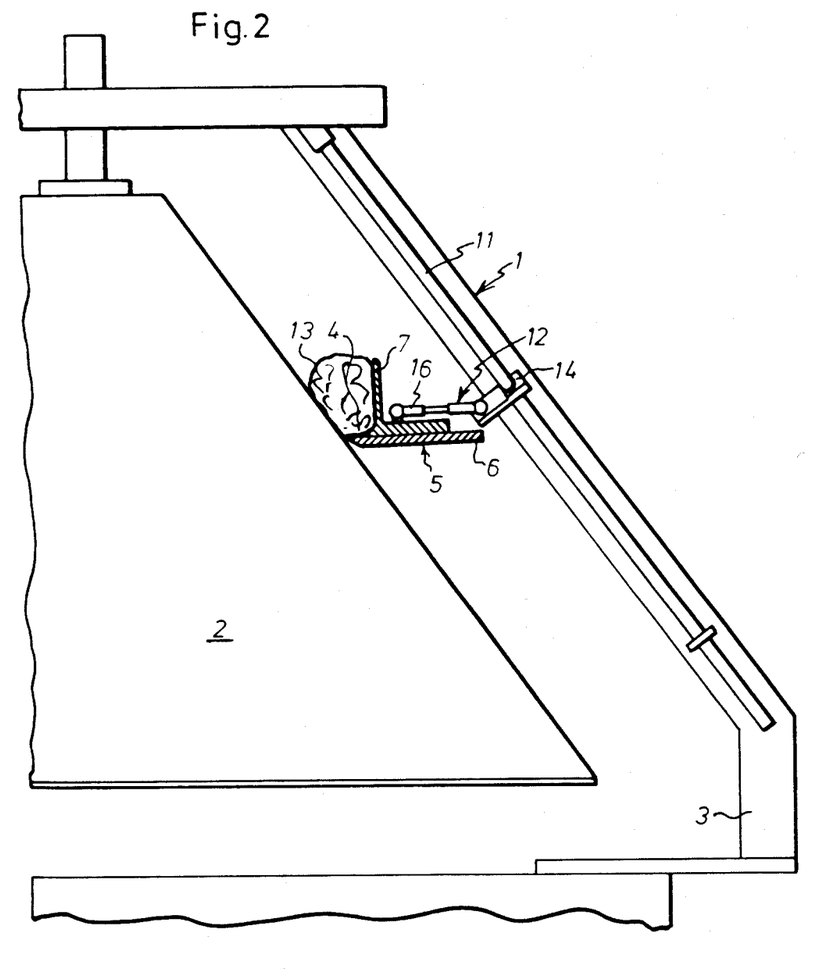
FIG. 2 is a cross-sectional view of a drum and a trough element, showing a dough piece in the trough formed therebetween.

The wall portion 7 is displaceable on the rail 6 in a direction towards and away from the drum 2, as lies in the trough 4 which is formed between the trough element 5 and the jacket of the drum 2. The trough extends helically from the lower to the upper part of the drum, the dough piece being conveyed upwardly during rotation of the drum. In this embodiment, the dough piece is conveyed through, at most, 1¾ turn around the drum.

Figure 3:
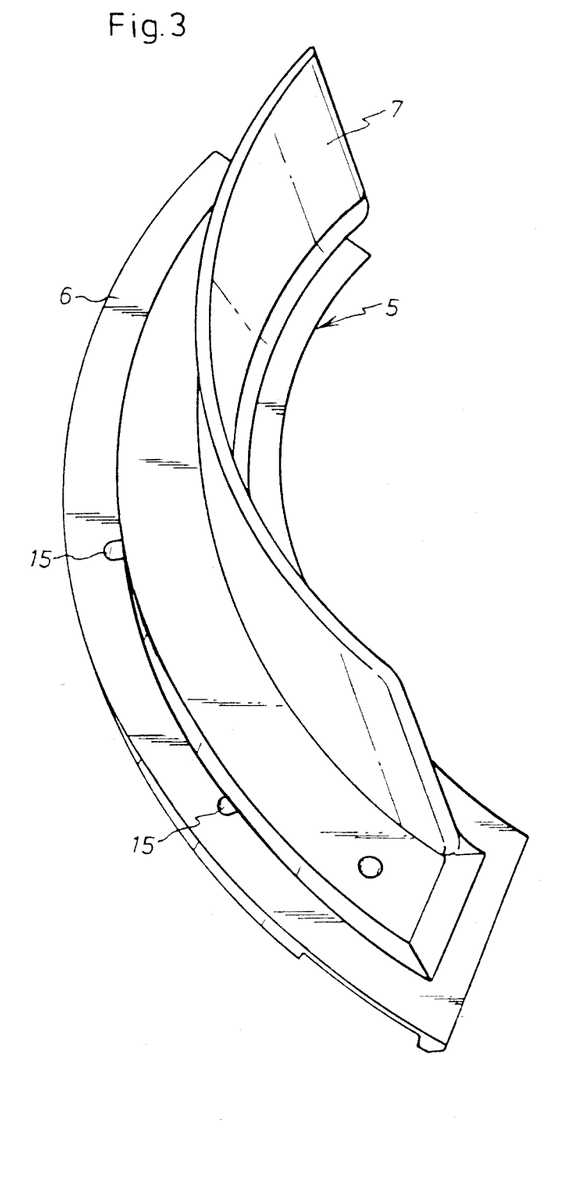
FIG. 3 is a perspective view of a trough element as seen from above.

FIG. 3 shows how the rail 6 and the wall portion 7 together form the trough element 5.

Figure 4:
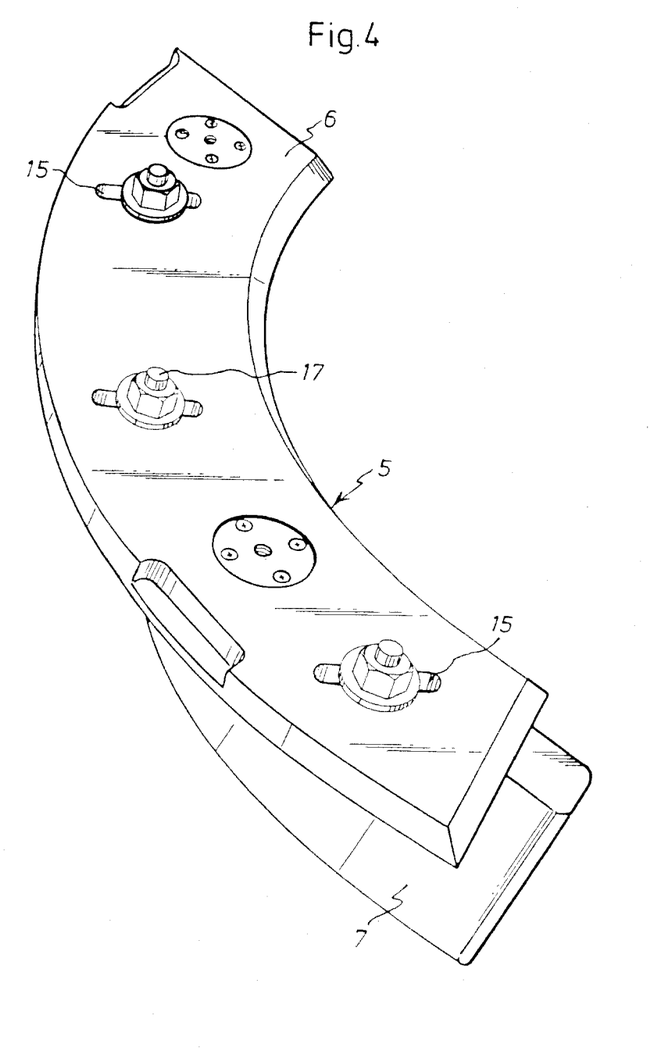
FIG. 4 shows the trough element in FIG. 5 as seen from below.

FIG. 4 shows that the rail 6 is provided with slots 15 within which parts 17 projecting from the wall portion 7 are running.

Figure 5:
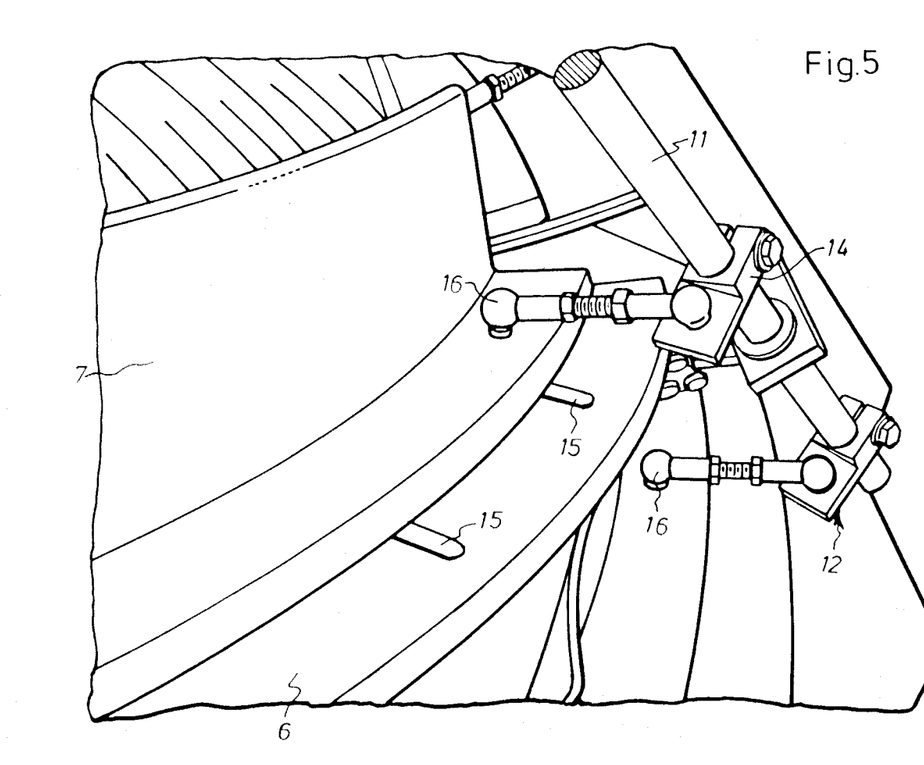
FIG. 5 is a perspective view of a link means.

FIG. 5 shows how the link means 12 which each comprises two hingedly interconnected arms 14, 16, are mounted between the rods 11 and the wall portions 7. When the rods 11 are rotated (which will be described in detail below), the arms 14 fixedly attached to the rods push the arms 16 and thus the wall portions 7 towards or away from the drum 2.

Each trough element 5 extends through 90° around the drum and, consequently, there are four joints for each turn. In each joint, the wall portions 7 are arranged such that the upper part of each wall portion is closer to the jacket of the drum 2 than the upper part of each subsequent wall portion. Moreover, the last part of each rail 6 is situated higher up than the first part of each subsequent rail. As a result, the transition from one trough element to the next element of the trough is not smooth, and the dough piece will thus be turned at each joint, whereby it is uniformly worked all around.

Figure 6:
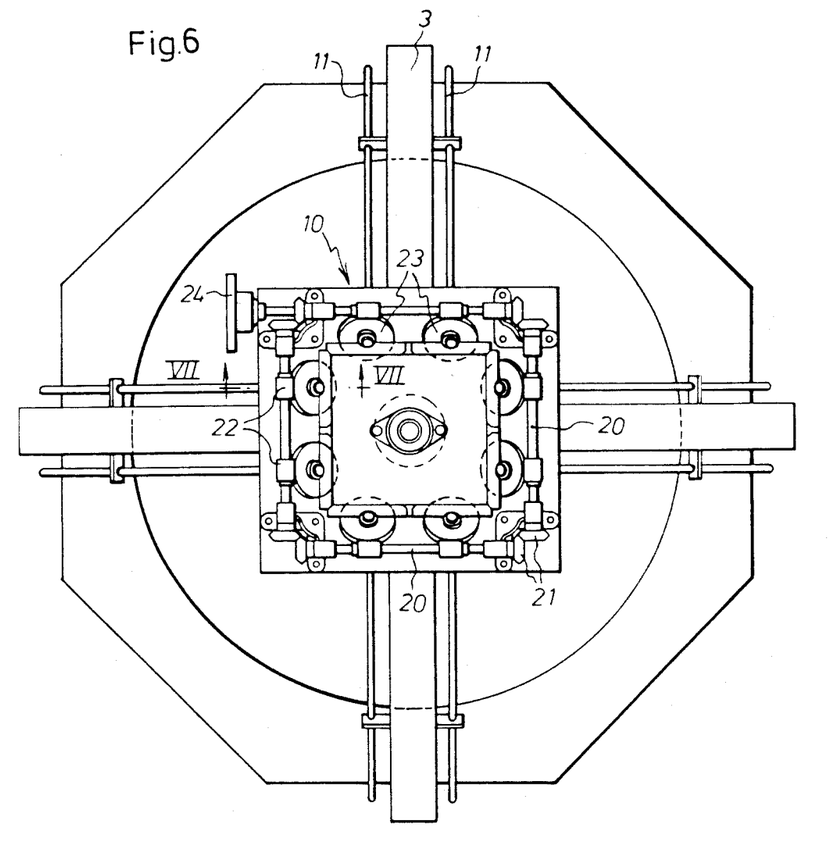
FIG. 6 is a top plan view of a control device.

FIG. 6 shows a control unit 10 as seen from above. The control unit comprises four shafts 20 mounted on the frame 3 and arranged in a square, the ends of said shafts being interconnected by pairs of bevel pinions 21.

Each shaft comprises two worms 22 cooperating each with one worm wheel 23 attached to the end of each rod 11. One end of one of the shafts 20 is provided with an adjusting wheel 24 which, when operated, causes its attachment shaft to turn and thus, via said pairs of bevel pinions 21, to turn the remaining three shafts. The turning movement is transmitted via the worm gears consisting of the worms 22 and the worm wheels 23 to the rods 11 which then transmit the movement to the wall portions 7, as described above.

Figure 7:
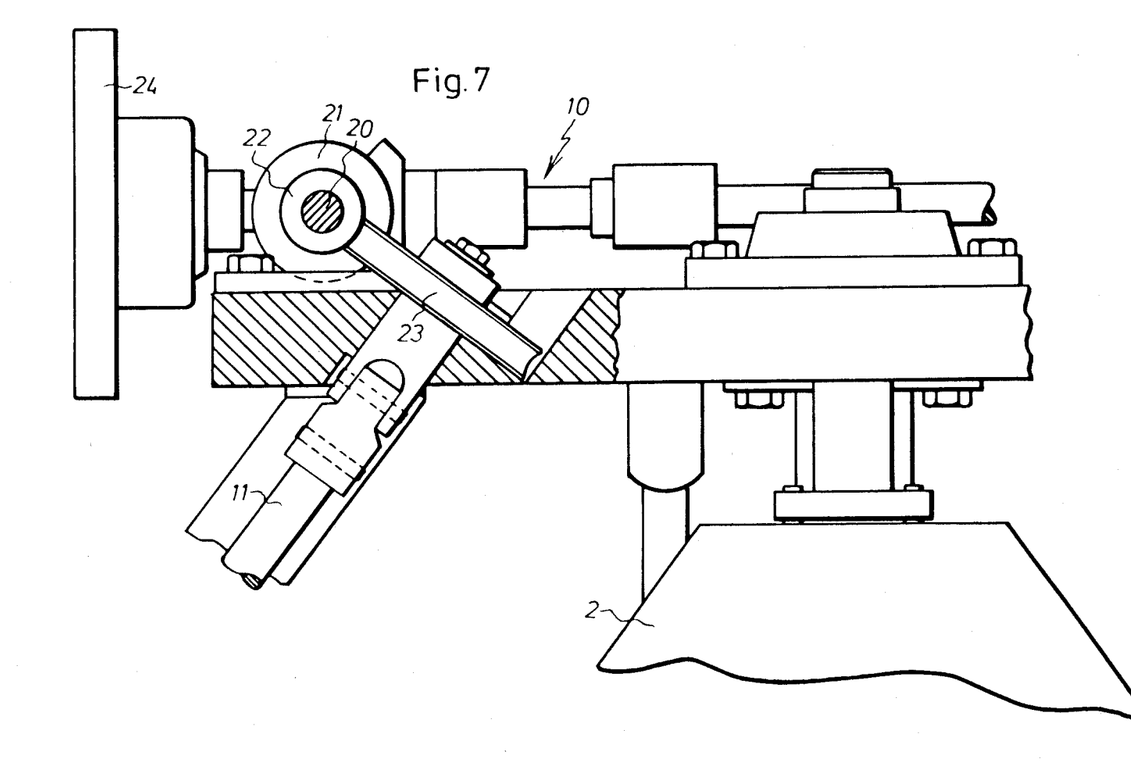
FIG. 7 is a section along line VII—VII in FIG. 6.

FIG. 7 shows how the worms 22 and the worm wheels 23 cooperate and how each worm wheel 23 is attached to the end of each rod 11.

When the width of the trough 4 is zeroised/calibrated, the adjusting wheel 24 is turned such that the wall portions 7 come as close as possible to the jacket of the drum 2. Subsequently, the arms 14 are disconnected from the rods 11, and the adjusting wheel is turned to zero position. The wall portions 7 are adjusted by hand to follow correctly the shape of the drum, whereupon the arms 14 are again attached to the rods. Now the trough is at minimum width. To increase the width, the adjusting wheel is operated, and all wall portions are carried along in a smooth outward movement. To decrease the trough width again, the adjusting wheel is simply turned in the other direction.

In this embodiment, the drum is conical, although of course it may also have any other circular-symmetrical shape, e.g. circular-cylindrical.

The control unit may also be mounted in a different position, as for example under instead of above the drum.

We claim:

1. A dough rounding machine comprising a conical drum rotatable about a vertical axis, a frame disposed around the drum and a trough which is formed between a jacket of the drum and a number of trough elements mounted on the frame and extending helically adjacent the jacket, each trough element comprising a rail fixedly mounted in the frame and abutting the drum, and a wall portion positioned on the rail and displaceable relative to the jacket, a control unit for adjusting a width of the trough, said unit comprising rotatable rods extending from a lower part towards an upper part of the drum and substantially parallel to the drum jacket, and link means for moving said wall portion when said rods are rotated, said link means interconnecting said rods and said wall portion, said control unit further comprising shafts mounted on the frame, said shafts having ends interconnected by pairs of bevel pinions, and each shaft comprising two worms cooperating each with one worm wheel attached to the end of each rod.

2. A dough rounding machine comprising a conical drum rotatable about a vertical axis, a frame disposed around the drum and a trough which is formed between a jacket of the drum and a number of trough elements mounted on the frame and extending helically adjacent the jacket, each trough element comprising a rail fixedly mounted in the frame and abutting the drum, and a wall portion positioned on the rail and displaceable relative to the jacket, a control unit for adjusting a width of the trough, said unit comprising rotatable rods extending from a lower part towards an upper part of the drum and substantially parallel to the drum jacket, and link means for moving said wall portion when said rods are rotated, said link means interconnecting said rods and said wall portion, said control unit further comprising shafts mounted on the frame, said shafts having ends interconnected by pairs of bevel pinions, and each shaft comprising two worms cooperating each with one worm wheel attached to the end of each rod, and an adjusting wheel for operating said shafts and said pairs of bevel pinions to move in synchronism for adjusting the width of the trough.

* * * * *

UNITED STATES PATENT AND TRADEMARK OFFICE
CERTIFICATE OF CORRECTION

PATENT NO. : 4,746,282

DATED : 24 May 1988

INVENTOR(S) : Nilsson, et al.

It is certified that error appears in the above-identified patent and that said Letters Patent is hereby corrected as shown below:

On the front page, in the "Attorney, Agent or Firm" information just before the "Abstract", "Walter" should be --Welter--.

In column 2, line 35, after "as" insert --shown in Fig. 2. As is also shown, the dough piece 13--.

Signed and Sealed this

Twenty-second Day of November, 1988

Attest:

DONALD J. QUIGG

Attesting Officer

Commissioner of Patents and Trademarks